United States Patent
Tsuchiya et al.

(10) Patent No.: US 10,385,224 B2
(45) Date of Patent: Aug. 20, 2019

(54) RADIATION CURABLE INK JET COMPOSITION AND RECORDING METHOD

(71) Applicant: Seiko Epson Corporation, Tokyo (JP)

(72) Inventors: Hitoshi Tsuchiya, Chino (JP); Keitaro Nakano, Matsumoto (JP); Toshiyuki Yoda, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/878,570

(22) Filed: Jan. 24, 2018

(65) Prior Publication Data

US 2018/0244933 A1 Aug. 30, 2018

(30) Foreign Application Priority Data

Feb. 28, 2017 (JP) ................. 2017-036965

(51) Int. Cl.
| | |
|---|---|
| *C09D 11/101* | (2014.01) |
| *C09D 11/107* | (2014.01) |
| *C09D 11/30* | (2014.01) |
| *B41J 11/00* | (2006.01) |
| *C09D 11/38* | (2014.01) |
| *C09D 11/324* | (2014.01) |

(52) U.S. Cl.
CPC .......... *C09D 11/101* (2013.01); *B41J 11/002* (2013.01); *C09D 11/107* (2013.01); *C09D 11/30* (2013.01); *C09D 11/324* (2013.01); *C09D 11/38* (2013.01)

(58) Field of Classification Search
CPC ...... C09D 11/101; C09D 11/30; B41J 11/002; B41J 2/01; B41J 2/2107
See application file for complete search history.

(56) References Cited

U.S. PATENT DOCUMENTS

| | | | | |
|---|---|---|---|---|
| 2003/0077059 | A1* | 4/2003 | Chien | ............... C03C 25/106 385/128 |
| 2013/0010039 | A1 | 1/2013 | Kida et al. | |
| 2013/0050366 | A1* | 2/2013 | Sasada | ............... C09D 11/101 347/100 |
| 2013/0295342 | A1* | 11/2013 | Araki | ............... C09D 11/101 428/195.1 |
| 2013/0319273 | A1* | 12/2013 | Vanmaele | ............... B41C 1/003 101/401.1 |
| 2014/0370214 | A1* | 12/2014 | Araki | ............... B41M 5/0029 428/35.7 |
| 2015/0315396 | A1 | 11/2015 | Kida et al. | |
| 2016/0326387 | A1* | 11/2016 | Arita | ............... B33Y 70/00 |
| 2017/0240754 | A1 | 8/2017 | Tsuchiya et al. | |

FOREIGN PATENT DOCUMENTS

| | | |
|---|---|---|
| JP | 2013-060548 A | 4/2013 |
| JP | 2017-149811 A | 8/2017 |

* cited by examiner

*Primary Examiner* — John Zimmermann
(74) *Attorney, Agent, or Firm* — Harness, Dickey & Pierce, P.L.C.

(57) ABSTRACT

A radiation curable ink jet composition contains an acrylate oligomer (A), a monofunctional monomer (B), and a predetermined monomer (C), in which the acrylate oligomer (A) has 1 to 3 acryloyl groups, the glass transition temperature of a homopolymer of the monofunctional monomer (B) is −20° C. or more and 30° C. or less, and the content of the monofunctional monomer (B) is 40% by mass or more based on the entire radiation curable ink jet composition.

20 Claims, 1 Drawing Sheet

RADIATION CURABLE INK JET COMPOSITION AND RECORDING METHOD

BACKGROUND

1. Technical Field

The present invention relates to a radiation curable ink jet composition and a recording method.

2. Related Art

An ink jet recording method enables recording of a high definition image with a relatively simple apparatus and has rapidly developed in various fields. In the development, various examinations have been made for discharge stability and the like. For example, JP-A-2013-60548 aims at providing a photocurable ink jet recording ink composition which is excellent in thick film curability and stretchability of a cured film in curing a thick film and which can prevent the generation of curing wrinkles in curing a thick film, and discloses a photocurable ink jet recording ink composition containing a photopolymerization initiator, 10 to 40% by mass of a vinyl ether group containing (meth)acrylic ester, 20 to 60% by mass of monofunctional (meth)acrylate, 10 to 40% by mass of polyfunctional (meth)acrylate, and a coloring material.

As the characteristics of a coating film to be obtained by a radiation curable ink jet composition, it is desirable that drawability, abrasion resistance, and curability are all improved. These characteristics are affected by the type and the addition amount of polymerizable monomers or oligomers but it is difficult to simultaneously improve all the characteristics. For example, a coating film to be obtained by the photocurable ink jet recording ink composition described in JP-A-2013-60548 is excellent in stretchability but it cannot be said to be sufficient from the viewpoint of the abrasion resistance. This is considered to be because, as a result of using a low functional polymerizable compound from the viewpoint of increasing the coating film drawability, the abrasion resistance has decreased on the contrary.

SUMMARY

The invention has been made to at least partially solve the above-described problems. An advantage of some aspects of the invention to provide a radiation curable ink jet composition excellent in drawability and also in abrasion resistance of a coating film to be obtained and a recording method using the radiation curable ink jet composition.

The present inventors have conducted an extensive examination in order to solve the above-described problems. As a result, the present inventors have found that the above-described problems can be solved by the use of a predetermined acrylate oligomer and a predetermined monomer, and thus have completed the invention.

More specifically, according to an aspect of the invention, provided is a radiation curable ink jet composition containing an acrylate oligomer (A), a monofunctional monomer (B), and a monomer (C) represented by the following formula (1), in which the acrylate oligomer (A) has 1 to 3 acryloyl groups, the glass transition temperature of a homopolymer of the monofunctional monomer (B) is −20° C. or more and 30° C. or less, and the content of the monofunctional monomer (B) is 40% by mass or more based on the entire radiation curable ink jet composition, $$CH_2=CR^1-COOR^2-O-CH=CH-R^3 \quad (1)$$

(in Formula (1), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms).

It is preferable in the radiation curable ink jet composition that the acrylate oligomer (A) is a urethane acrylate oligomer, monofunctional (meth)acrylate containing an aromatic ring skeleton different from the monofunctional monomer (B) is further contained, an acylphosphine oxide compound is further contained as an initiator, the content of the initiator is 3 to 15% by mass based on the entire radiation curable ink jet composition, the content of the monofunctional (meth)acrylate containing an aromatic ring skeleton is 3 to 35% by mass based on the entire radiation curable ink jet composition, and the glass transition temperature of the homopolymer of the monofunctional monomer (B) is −20° C. or more and 15° C. or less.

According to another aspect of the invention, also provided is a recording method having adhering the above-described radiation curable ink jet composition to a target recording medium, and curing the radiation curable ink jet composition adhering to the target recording medium using a UV-LED light source.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention (hereinafter referred to as "this embodiment") is described in detail with reference to the drawings as necessary but the invention is not limited thereto and can be variously modified without deviating from the scope. In the drawings, the same components are designated by the same reference numerals and the same description is omitted. The positional relationship, such as left, right, top and bottom, shall be based on the positional relationship illustrated in the drawings unless otherwise particularly specified. Furthermore, the dimension ratio of the drawings is not limited to the ratio in the drawings.

In this embodiment, the "radiation" refers to ultraviolet rays, electron beams, visible light, and the like. The "curable" refers to curing for use. The "(meth)acrylate" means both acrylate and methacrylate corresponding thereto.

Radiation Curable Ink Jet Composition

A radiation curable ink jet composition of this embodiment is a radiation curable ink jet composition containing an acrylate oligomer (A), a monofunctional monomer (B), and a monomer (C) represented by the following formula (1), in which the acrylate oligomer (A) has 1 to 3 acryloyl groups, the glass transition temperature of a homopolymer of the monofunctional monomer (B) is −20° C. or more and 30° C.

or less, and the content of the monofunctional monomer (B) is 40% by mass or more based on the entire radiation curable ink jet composition, $$CH_2=CR^1-COOR^2-O-CH=CH-R^3 \quad (1)$$

(in Formula (1), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.).

In usual, when a low functional acrylate oligomer having 1 to 3 acryloyl groups is used, the coating film drawability increases but there have been problems that the abrasion resistance decreases or the viscosity increases. On the other hand, the radiation curable ink jet composition of this embodiment can improve the abrasion resistance while maintaining high coating film drawability by the use of a predetermined amount of a monofunctional monomer having a glass transition temperature in a predetermined range in addition to a low functional acrylate oligomer. Moreover, by the use of the monomer represented by Formula (1), the curability and the abrasion resistance can be improved and a viscosity increase can be suppressed. In particular, the abrasion resistance of a coating film is further improved by using the acrylate oligomer (A), the monofunctional monomer (B), and the monomer (C) in combination. Hereinafter, each component of the radiation curable ink jet composition of this embodiment is described in detail.

Acrylate Oligomer (A)

The acrylate oligomer (A) is not particularly limited insofar it is an oligomer having 1 to 3 acryloyl groups and, for example, a urethane acrylate oligomer, an epoxy acrylate oligomer, and a polyester acrylate oligomer are mentioned. Among the above, the urethane acrylate oligomer is preferable. The acrylate oligomers (A) may be used alone or in combination of two or more kinds thereof.

The acrylate oligomer in the invention may be a methacrylate oligomer. Herein, the methacrylate oligomer is an oligomer having a methacryloyl group.

The oligomer of this embodiment is preferably one having a mass average molecular weight in the range of 350 to 30000. The mass average molecular weight as used herein can be measured as a mass average molecular weight in terms of styrene using THF as a solvent and using a gel permeation chromatography (GPC) (L7100 system, manufactured by Hitachi, Ltd.).

Moreover, the oligomer of this embodiment is also preferably one having a weight average molecular weight almost the same as that of products mentioned as examples of the urethane acrylate oligomer, the epoxy acrylate oligomer, and the polyester acrylate oligomer described later. When the weight average molecular weight is within the range of ±5%, it can be regarded that the weight average molecular weights are almost the same.

Moreover, the oligomer as used in this embodiment is also preferably a compound in which a peak derived from oligomer constituent components is detected in a pyrolysis mode (pyrolysis temperature of 550° C.) of pyrolysis GC-MS and in which a peak with the same mass is not detected in a thermal desorption mode (300° C.) for measuring a volatile substance or, even when detected, the peak area in the pyrolysis mode is larger.

Herein, the GC-MS measurement can be performed using a 5975inert (manufactured by Agilent Technologies) as the GC-MS and using UA-5 as a column at a flow velocity of 1 ml/min, an inlet temperature of 320° C., an interface temperature of 320° C., and an oven temperature of 320° C., for example. In the pyrolysis mode, the heating temperature can be set to 550° C. as the temperature at which instantaneous pyrolysis is performed, for example. The thermal desorption mode can be performed by increasing the temperature from 100° C. to 300° C. at 30° C./min, and then holding the temperature for 5 min as an operation for extracting a volatile substance, for example.

Herein, examples of oligomer constituent components include polyisocyanate compounds, such as diisocyanate and triisocyanate, in the case of a urethane acrylate oligomer, for example.

The urethane acrylate oligomer is not particularly limited and, for example, a polyether-based urethane acrylate oligomer having a polyether skeleton, a polyester-based urethane acrylate oligomer having a polyester skeleton, and a polycarbonate-based urethane acrylate oligomer having a polycarbonate skeleton are preferably used. Moreover, an aromatic urethane acrylate oligomer and an aliphatic urethane acrylate oligomer are also preferable and an aliphatic urethane acrylate oligomer is more preferable. In particular, a polyether-based aliphatic urethane acrylate oligomer is particularly preferable.

Examples of the urethane acrylate oligomer include, but are not particularly limited to, polyether-based aliphatic urethane acrylate oligomers, such as CN980 (Number of functional groups: 2), CN996 (Number of functional groups: 2), CN9893 (Number of functional groups: 2), and CN989 (Number of functional groups: 3); alicyclic group containing urethane acrylate oligomers, such as CN2920 and CN9011; polyester-based aromatic urethane acrylate oligomers, such as CN971 (Number of functional groups: 3), CN972 (Number of functional groups: 3), CN978 (Number of functional groups: 2), CN9782 (Number of functional groups: 2), and CN9783 (Number of functional groups: 2); polyester-based aliphatic urethane acrylate oligomers, such as CN929 (Number of functional groups: 3), CN962 (Number of functional groups: 2), CN963 (Number of functional groups: 2), CN964 (Number of functional groups: 2), CN965 (Number of functional groups: 2), CN981 (Number of functional groups: 2), CN982 (Number of functional groups: 2), CN983 (Number of functional groups: 2), CN9001 (Number of functional groups: 2), CN9002 (Number of functional groups: 2), and CN9788 (Number of functional groups: 2); polyester-based alicyclic urethane acrylate oligomers, such as CN991 (Number of functional groups: 2) (all manufactured by Sartomer Company, Inc.), aliphatic urethane acrylate oligomers, such as EBECRYL 230 (Number of functional groups: 2), 270 (Number of functional groups: 2), 8311 (Number of functional groups: 3), 8402 (Number of functional groups: 2), 8701 (Number of functional groups: 3), 8804 (Number of functional groups: 2), 8807 (Number of functional groups: 2), 9260 (Number of functional groups: 3), 9270 (Number of functional groups: 2), KRM8200 (Number of functional groups: 6), 8296 (Number of functional groups: 3), and 8452 (Number of functional groups: 10) (all Trade Names, manufactured by DAICEL-CYTEC Co., Ltd.); and aromatic urethane acrylate oligomers, such as EBECRYL 210 (Number of functional groups: 2) (Trade Name, manufactured by DAICEL-CYTEC Co., Ltd.), for example. By the use of such urethane acrylate oligomers, the tensile elongation and the tensile strength and particularly the tensile elongation of a three-dimensional shaped object to be obtained tends to further improve.

Examples of the epoxy acrylate oligomer include, but are not particularly limited to, at least one kind selected from the group consisting of compounds having a bisphenol A skeleton and compounds having a polyester skeleton, for example. Examples of commercially-available items of such oligomers include, but are not particularly limited to, bisphenol A skeleton containing epoxy acrylate bifunctional oligomers, such as CN136, CN104, CN118, and CN120; and polyester skeleton containing epoxy acrylate bifunctional oligomers, such as CN2003 and CNUVE151 (all manufactured by Sartomer Company, Inc.), for example. By the use of such epoxy acrylate oligomers, the tensile elongation and the tensile strength and particularly the tensile strength of a three-dimensional shaped object to be obtained tend to further improve.

Examples of the polyester acrylate oligomer include, but are not particularly limited to, polyester acrylate oligomers, such as CN2254, for example.

The number of the acryloyl groups of the acrylate oligomer (A) is 1 to 3, preferably 2 to 3, and more preferably 2. Due to the fact that the number of the acryloyl groups is within the ranges mentioned above, the drawability of a coating film to be obtained further improves.

The content of the acrylate oligomer (A) is preferably 1 to 15% by mass, more preferably 2.5 to 12% by mass, and still more preferably 5 to 10% by mass based on the entire radiation curable ink jet composition. Due to the fact that the content of the acrylate oligomer (A) is within the ranges mentioned above, the abrasion resistance and the drawability of a coating film to be obtained tend to further improve.

Monofunctional Monomer (B)

The glass transition temperature of the homopolymer of the monofunctional monomer (B) is −20° C. or more and 30° C. or less, preferably −20° C. or more and 15° C. or less, and more preferably −15° C. or more and 15° C. or less. Due to the fact that the glass transition temperature of the homopolymer of the monofunctional monomer (B) is within the ranges mentioned above, particularly due to the fact that the glass transition temperature is −20° C. or more, the hardness of a coating film to be obtained from the radiation curable ink jet composition is improved, and due to the fact that the glass transition temperature is 30° C. or less, the brittleness of the coating film is improved, and the abrasion resistance and the drawability of the coating film to be obtained are further improved.

The monofunctional monomer (B) does not contain the monomer (C) described below.

Examples of the homopolymer having a glass transition temperature of −20° C. or more and 30° C. or less include, but are not particularly limited to, a methoxy methacrylate homopolymer (Glass transition temperature: 16° C.), a 2-hydroxyethyl acrylate homopolymer (Glass transition temperature: −15° C.), a tetrahydrofurfuryl acrylate homopolymer (Glass transition temperature: −12° C.), a 2-ethylhexyl methacrylate homopolymer (Glass transition temperature: −10° C.), a 2-hydroxybutyl acrylate homopolymer (Glass transition temperature: −7° C.), a hexyl methacrylate homopolymer (Glass transition temperature: −5° C.), a pentyl methacrylate homopolymer (Glass transition temperature: 5° C.), an iso-propyl acrylate homopolymer (Glass transition temperature: −3° C.), a propyl acrylate homopolymer (Glass transition temperature: 3° C.), a benzyl acrylate homopolymer (Glass transition temperature: 6° C.), a methyl acrylate homopolymer (Glass transition temperature: 8° C.), a lauryl acrylate homopolymer (Glass transition temperature: 10° C.), a cyclohexyl acrylate homopolymer (Glass transition temperature: 15° C.), a hexadecyl methacrylate homopolymer (Glass transition temperature: 15° C.), an ethoxyethyl methacrylate homopolymer (Glass transition temperature: 15° C.), a cyclohexyl acrylate homopolymer (Glass transition temperature: 15° C. to 19° C.), a 2-hydroxy-3-phenoxypropylacrylate homopolymer (Glass transition temperature: 17° C.), an N,N-dimethylaminoethyl acrylate homopolymer (Glass transition temperature: 18° C.), an N,N-dimethyl aminoethyl methacrylate homopolymer (Glass transition temperature: 18° C.), an N,N-diethyl aminoethyl methacrylate homopolymer (Glass transition temperature: 20° C.), a butylmethacrylate homopolymer (Glass transition temperature: 20° C.), a pentyl acrylate homopolymer (Glass transition temperature: 22° C.), a tetradecyl acrylate homopolymer (Glass transition temperature: 24° C.), a 2-hydroxybutylmethacrylate homopolymer (Glass transition temperature: 26° C.), a cyclic trimethylolpropane formal acrylate (Glass transition temperature: 27° C.), and a 3,3,5-trimethyl cyclohexanol acrylate homopolymer (Glass transition temperature: 29° C.), for example. As the monofunctional monomer (B), monomers configuring the homopolymer are usable.

Among the above, the monomers configuring the tetrahydrofurfuryl acrylate homopolymer (Glass transition temperature: −12° C.), the benzyl acrylate homopolymer (Glass transition temperature: 6° C.), the cyclohexyl acrylate homopolymer (Glass transition temperature: 15° C.), the 2-hydroxy-3-phenoxy propyl acrylate homopolymer (Glass transition temperature: 17° C.), the cyclic trimethylolpropane formal acrylate (Glass transition temperature: 27° C.), and the 3,3,5-trimethyl cyclohexanol acrylate homopolymer (Glass transition temperature: 29° C.) are preferable, and monomers configuring the tetrahydrofurfuryl acrylate homopolymer (Glass transition temperature: −12° C.), the benzyl acrylate homopolymer (Glass transition temperature: 6° C.), the cyclohexyl acrylate homopolymer (Glass transition temperature: 15° C.), the cyclic trimethylolpropane formal acrylate (Glass transition temperature: 27° C.), and the 3,3,5-trimethyl cyclohexanol acrylate homopolymer (Glass transition temperature: 29° C.) are more preferable. In particular, the monofunctional monomer (B) is preferably a monomer not containing a hydroxyl group from the viewpoint of coating film drawability, curability, and viscosity and is more preferably a monomer having either an alicyclic group or a heterocyclic group from the viewpoint of coating film abrasion resistance and coating film drawability, curability, and viscosity. By the use of such a monofunctional monomer (B), there is a tendency that the viscosity of the radiation curable ink jet composition decreases, the curability is further improved, and the abrasion resistance and the drawability of a coating film to be obtained are further improved.

The content of the monofunctional monomer (B) is 40% by mass or more, preferably 40 to 75% by mass, more preferably 40 to 70% by mass, still more preferably 40 to 60% by mass, and particularly preferably 40 to 55% by mass based on the entire radiation curable ink jet composition. Due to the fact that the content of the monofunctional monomer (B) is within the ranges mentioned above, there is a tendency that the abrasion resistance and the drawability of a coating film to be obtained are further improved.

The ratio (B/A) of the content of the monofunctional monomer (B) to the content of the acrylate oligomer (A) is preferably 2 to 17.5, more preferably 3 to 15, still more preferably 4 to 10, and particularly preferably 4.5 to 8. Due to the fact that the ratio (B/A) of the content of the monofunctional monomer (B) to the content of the acrylate oligomer (A) is within the ranges mentioned above, there is a tendency that the viscosity of the radiation curable ink jet composition decreases, the curability is further improved, and the abrasion resistance and the drawability of a coating film to be obtained are further improved.

In the case of containing the other monomers described later, the ratio (B/Other monomers) of the content of the monofunctional monomer (B) to the content of the other monomers is preferably 1.1 to 17, more preferably 1.2 to 6, and still more preferably 1.9 to 5.1. Due to the fact that the ratio (B/Other monomers) of the content of the monofunctional monomer (B) to the content of the other monomers is within the ranges mentioned above, the curability of the radiation curable ink jet composition is further improved and the abrasion resistance and the drawability of a coating film to be obtained are further improved in some cases.

A method for measuring the glass transition temperature can be performed by differential scanning calorimetry (DSC) based on JIS K7121. As a measuring device, a "DSC6220" model manufactured by Seiko Instruments Inc. is used. As a sample, one obtained by polymerizing monomers until the glass transition temperature is fixed is usable.

Monomer (C)

The compound represented by Formula (1) above includes, but are not particularly limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethyl cyclohexylmethyl (meth)acrylate, 3-vinyloxymethyl cyclohexylmethyl (meth)acrylate, 2-vinyloxymethyl cyclohexylmethyl (meth)acrylate, p-vinyloxymethyl phenylmethyl (meth)acrylate, m-vinyloxymethyl phenylmethyl (meth)acrylate, o-vinyloxymethyl phenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy) propyl (meth)acrylate, 2-(vinyloxyisopropoxyethoxy) propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinylether (meth)acrylate, and polypropylene glycol monovinylether (meth)acrylate, for example. Among the substances mentioned above, the 2-vinyloxyethyl (meth)acrylate, the 3-vinyloxypropyl (meth)acrylate, the 1-methyl-2-vinyloxyethyl (meth)acrylate, the 2-vinyloxypropyl (meth)acrylate, the 4-vinyloxybutyl (meth)acrylate, the 4-vinyloxycyclohexyl (meth)acrylate, 5-vinyloxypentyl (meth)acrylate, the 6-vinyloxyhexyl (meth)acrylate, the 4-vinyloxymethyl cyclohexylmethyl (meth)acrylate, the p-vinyloxymethyl phenylmethyl (meth)acrylate, the 2-(vinyloxyethoxy)ethyl (meth)acrylate, the 2-(vinyloxyethoxyethoxy)ethyl (meth)acrylate, and the 2-(vinyloxyethoxyethoxyethoxy)ethyl (meth)acrylate are preferable.

Among the above, the 2-(vinyloxyethoxy)ethyl (meth)acrylate is preferable and the 2-(vinyloxyethoxy)ethyl acrylate is more preferable because there is a tendency that the viscosity of the radiation curable ink jet composition decreases, the curability is further improved, and the abrasion resistance of a coating film to be obtained is further improved.

Examples of the 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of the 2-(vinyloxyethoxy)ethyl acrylate include 2-(2-vinyloxyethoxy)ethyl acrylate and 2-(1-vinyloxyethoxy)ethyl acrylate.

The content of the monomer (C) is preferably 2.5 to 40% by mass, more preferably 5 to 35% by mass, and still more preferably 10 to 25% by mass based on the entire radiation curable ink jet composition. Due to the fact that the content of the monomer (C) is within the ranges mentioned above, there is a tendency that the viscosity of the radiation curable ink jet composition decreases, the curability is further improved, and the abrasion resistance of a coating film to be obtained is further improved.

The ratio (A/C) of the content of the acrylate oligomer (A) to the content of the monomer (C) is preferably 0.1 to 1.5, more preferably 0.15 to 1, still more preferably 0.3 to 0.8, and particularly preferably 0.4 to 0.6. Due to the fact that the ratio (A/C) of the content of the acrylate oligomer (A) to the content of the monomer (C) is within the ranges mentioned above, there is a tendency that a viscosity increase originating from the acrylate oligomer (A) of the radiation curable ink jet composition is suppressed, the curability is further improved, and the abrasion resistance and the drawability of a coating film to be obtained are further improved.

Other Monomers

The radiation curable ink jet composition of this embodiment may also contain monomers other than the monomer (B) and the monomer (C) in the range where the effects of the invention are not impaired. Such monomers may be compounds in which the glass transition temperature of homopolymers is −40° C. or more and less than −20° C. or compounds in which the glass transition temperature of homopolymers is more than 30° C. and 150° C. or less and are preferably compounds in which the glass transition temperature of homopolymers is −30° C. or more and −21° C. or less. As such other monomers, monofunctional (meth)acrylate having an aromatic ring skeleton may be contained, for example. The monofunctional (meth)acrylate having an aromatic ring skeleton is a compound having an aromatic ring skeleton and having one (meth)acryloyl group as a polymerizable functional group in one molecule. Examples of the monofunctional (meth)acrylate having an aromatic ring skeleton include, but are not limited to the following substances, a phenoxyethyl acrylate (PEA), for example. The phenoxyethylacrylate is a compound in which the glass transition temperature of a homopolymer is −22° C. By the use of the phenoxyethylacrylate, the solubility of the polymerization initiator in the radiation curable ink jet composition is further improved and therefore, there is a tendency that, even when a relatively large amount of a polymerization initiator is used, the discharge stability and the like are difficult to decrease and the curability is further improved.

When the monofunctional (meth)acrylate having an aromatic ring skeleton is contained as the monomers other than the monomer (B) and the monomer (C), the content thereof is preferably 3 to 35% by mass, more preferably 5 to 30% by mass, still more preferably 7.5 to 25% by mass, and particularly preferably 7.5 to 20% by mass based on the entire radiation curable ink jet composition. Due to the fact that the content of the monofunctional (meth)acrylate having an aromatic ring skeleton is within the ranges mentioned above, there is a tendency that, even when a relatively large amount of a polymerization initiator is used, the discharge stability and the like are difficult to decrease and the curability is further improved.

Moreover, a monofunctional polymerizable compound having a non-aromatic ring skeleton, for example, may be contained as the other monomers. As such a compound, a monofunctional (meth)acryl compound having a non-aromatic ring skeleton and a monofunctional vinyl compound having a non-aromatic ring skeleton are preferable and a monofunctional (meth)acrylamide compound having a non-aromatic ring skeleton and a monofunctional N-vinyl compound having a non-aromatic ring skeleton are more preferable. Examples of the non-aromatic ring skeleton include an alicyclic ring skeleton and a heterocyclic ring skeleton. Examples of the monofunctional (meth)acrylamide compound having a non-aromatic ring skeleton include acryloyl morpholine (ACMO) and examples of the monofunctional N-vinyl compound having a non-aromatic ring skeleton include N-vinyl caprolactam (n-VC), for example. The acryloyl morpholine is a compound in which the glass transition temperature of a homopolymer is 145° C. The N-vinyl caprolactam is a compound in which the glass transition temperature of a homopolymer is 90° C. By the use of the acryloyl morpholine (ACMO) or the N-vinyl caprolactam (n-VC), there is a tendency that the strength of a coating film is improved and the abrasion resistance is further improved due to having a moderately bulky ring structure and, because the acryloyl morpholine (ACMO) or the N-vinyl caprolactam (n-VC) is monofunctional, the crosslink density does not increase and the coating film drawability is further improved.

When the monofunctional polymerizable compound having a non-aromatic ring skeleton is contained as the monomers other than the monomer (B) and the monomer (C), the content thereof is preferably 3 to 35% by mass, more preferably 5 to 20% by mass, and particularly preferably 7 to 13% by mass based on the entire radiation curable ink jet composition.

When the radiation curable ink jet composition of this embodiment contains the monomers other than the monomer (B) and the monomer (C), the content of the monomers other than the monomer (B) and the monomer (C) is preferably 50% by mass or less, more preferably 40% by mass or less, and still more preferably 30% by mass or less based on the entire radiation curable ink jet composition. The content is preferably 3% by mass or more, more preferably 5% by mass or more, and still more preferably 10% by mass or more.

Initiator

The radiation curable ink jet composition of this embodiment may also contain an initiator. Examples of the initiator include, but are not particularly limited to, an acylphosphine oxide compound, a thioxanthone compound, and other polymerization initiators, for example. Among the above, the acylphosphine oxide compound is preferable and the use of the acylphosphine oxide compound and the thioxanthone compound in combination is more preferable. By the use of such photopolymerization initiators, there is a tendency that the curability using an LED of a long wavelength light is further improved.

Examples of the acylphosphine oxide compound include, but are not particularly limited to, a bis(2,4,6-trimethylbenzoyl)-phenyl phosphine oxide, a 2,4,6-trimethylbenzoyl-diphenyl-phosphine oxide, and a bis-(2,6-dimethoxybenzoyl)-2,4,4-trimethylpentyl phosphine oxide, for example. Examples of commercially-available items of the acylphosphine oxide compound include, but are not particularly limited to, IRGACURE 819 (bis(2,4,6-trimethyl benzoyl)-phenyl phosphine oxide) and DAROCUR TPO (2,4,6-trimethyl benzoyl-diphenyl-phosphine oxide), for example.

The content of the acylphosphine oxide compound is preferably 3 to 15% by mass, more preferably 5 to 12.5% by mass, and still more preferably 6 to 10% by mass based on the entire radiation curable ink jet composition. Due to the fact that the content of the acylphosphine oxide compound is within the ranges mentioned above, there is a tendency that the dissolution of a solid content and the storage stability are favorably kept and the reliability is more excellent.

Examples of the thioxanthone compound include, but are not particularly limited to, thioxanthone; diethylthioxanthone, such as 2,4-diethylthioxanthone; isopropylthioxanthone, such as 2-isopropylthioxanthone; and chlorothioxanthone, such as 2-chlorothioxanthone, for example. Specific examples of commercially-available items of the thioxanthone compound include, but are not particularly limited to, Speedcure DETX (2,4-diethylthioxanthone) and Speedcure ITX (2-isopropylthioxanthone) (all manufactured by Lambson) and KAYACURE DETX-S (2,4-diethylthioxanthone) (manufactured by Nippon Kayaku Co.).

The content of the thioxanthone compound is preferably 0.5 to 7.5% by mass, more preferably 1 to 5% by mass, and still more preferably 2 to 3% by mass based on the entire radiation curable ink jet composition. Due to the fact that the content of the thioxanthone compound is within the ranges mentioned above, there is a tendency that polymerization inhibition by oxygen is hard to occur and the curability is further improved.

The content of the initiator is preferably 3 to 15% by mass, more preferably 5 to 15% by mass, and still more preferably 7.5 to 12.5% by mass based on the entire radiation curable ink jet composition. Due to the fact that the content of the initiator is within the ranges mentioned above, there is a tendency that the curability is further improved.

Surfactant

The radiation curable ink jet composition of this embodiment may also further contain a surfactant. Examples of the surfactant include, but are not particularly limited to, silicone-based surfactants (e.g., BYK UV3500 and UV3570 (Trade Names, manufactured by BYK Chemie Japan) as commercially-available items), for example.

The content of the surfactant is preferably 0.05 to 1.5% by mass, more preferably 0.1 to 1% by mass, and still more preferably 0.25 to 0.75% by mass based on the entire radiation curable ink jet composition.

Dispersant

The radiation curable ink jet composition of this embodiment may also contain a dispersant in order to further improve pigment dispersion properties. Examples of the dispersant include, but are not particularly limited to, dispersants commonly used for preparing a pigment dispersion liquid, such as a polymer dispersant, for example. Specific examples of the dispersants include those containing one or more kinds of polyoxyalkylene polyalkylene polyamine, vinyl-based polymers and copolymers, acrylic polymers and copolymers, polyester, polyamide, polyimide, polyurethane, amino-based polymers, silicon containing polymers, sulfur containing polymers, fluorine containing polymers, and epoxy resin as the main component. Examples of commercially-available items of the polymer dispersant include AJISPER series (Trade Name) manufactured by Ajinomoto Fine-Techno Co., Inc., Solsperse series (Solsperse 32000 and 36000, for example, [all Trade Names]) available from Avecia Co., Disper BYK series (Trade Name) manufactured by BYKChemie, and Disperon series (Trade Name) manufactured by Kusumoto Chemicals, Ltd.

The dispersants may be used alone or in combination of two or more kinds thereof. The content of the dispersant is not particularly limited and a preferable amount thereof may be added as appropriate.

Polymerization Inhibitor

The radiation curable ink jet composition of this embodiment may also contain a polymerization inhibitor. Due to the fact that an ink contains the polymerization inhibitor, a polymerization reaction before curing can be prevented.

Examples of the polymerization inhibitor, but are not particularly limited to, a phenolic polymerization inhibitor, for example. Examples of the phenolic polymerization inhibitor include, but are not limited to the following substances, p-methoxy phenol, cresol, t-butyl catechol, di-t-butyl-p-cresol, hydroquinone monomethylether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol), for example.

The polymerization inhibitors may be used alone or in combination of two or more kinds thereof. The content of the polymerization inhibitor is not particularly limited and a preferable amount thereof may be added as appropriate.

Recording Method

A recording method of this embodiment has an adhesion process of causing the above-described radiation curable ink jet composition to adhere to a target recording medium and a curing process of curing the radiation curable ink jet composition adhering to the target recording medium using a UV light source.

Adhesion Process

The adhesion process is a process of causing the radiation curable ink jet composition to adhere to a target recording medium. The radiation curable ink jet composition can be discharged using an ink jet head having an electromechanical conversion element, such as a piezoelectric element, varying the capacity of a cavity by mechanical deformation, a thermoelectric conversion element generating foams in an ink by generating heat to discharge the ink, or the like to be caused to adhere to a target recording medium.

Curing Process

The curing process is a process of curing the radiation curable ink jet composition adhering to the target recording medium by a UV irradiation unit. The UV irradiation unit is not particularly limited and a UV-LED light source is usable, for example. By the use of the UV-LED light source, a reduction in size and an increase in life of a recording apparatus and an increase in efficiency and a reduction in cost of a recording method as compared with a case of using a metal halide light source or a mercury lamp can be achieved.

Target Recording Medium

Examples of the target recording medium include, but are not particularly limited to, an absorptive or non-absorptive recording medium, for example. Among the above, the non-absorptive recording medium is preferable.

Examples of the absorptive target recording medium include, but are not particularly limited to, plain paper, such as an electrophotographic paper, and ink jet printing paper (paper for exclusive use for ink jet having an ink absorbing layer containing silica particles or alumina particles or an ink absorbing layer containing a hydrophilic polymer, such as polyvinyl alcohol (PVA) or polyvinyl pyrrolidone (PVP)) having high ink permeability and an art paper, a coated paper, a cast paper, and the like for use in general offset printing having relatively low ink permeability, for example.

Examples of the non-absorptive target recording medium include, but are not particularly limited to, films or plates of plastics, such as polyvinyl chloride, polyethylene, polypropylene, polyethylene terephthalate (PET), polycarbonate, polystyrene, and polyurethane; plates of metals, such as iron, silver, copper, and aluminum; metal plates manufactured by vapor deposition of these various metals, plastic films, plates of alloys, such as stainless steel or brass; and target recording media in which films of plastics, such polyvinyl chloride, polyethylene, polypropylene, polyethylene terephthalate (PET), polycarbonate, polystyrene, and polyurethane (coating), are bonded (coating) to a paper base material, and the like, for example.

Recording Apparatus

A recording apparatus of this embodiment has a discharge portion discharging the radiation curable ink jet composition and an irradiation portion emitting ultraviolet rays.

Hereinafter, the recording apparatus (printer) for performing the above-described recording method is described with reference to the drawings. The recording apparatus to be used in this embodiment is not particularly limited to a recording apparatus described below at all.

Figure 1:
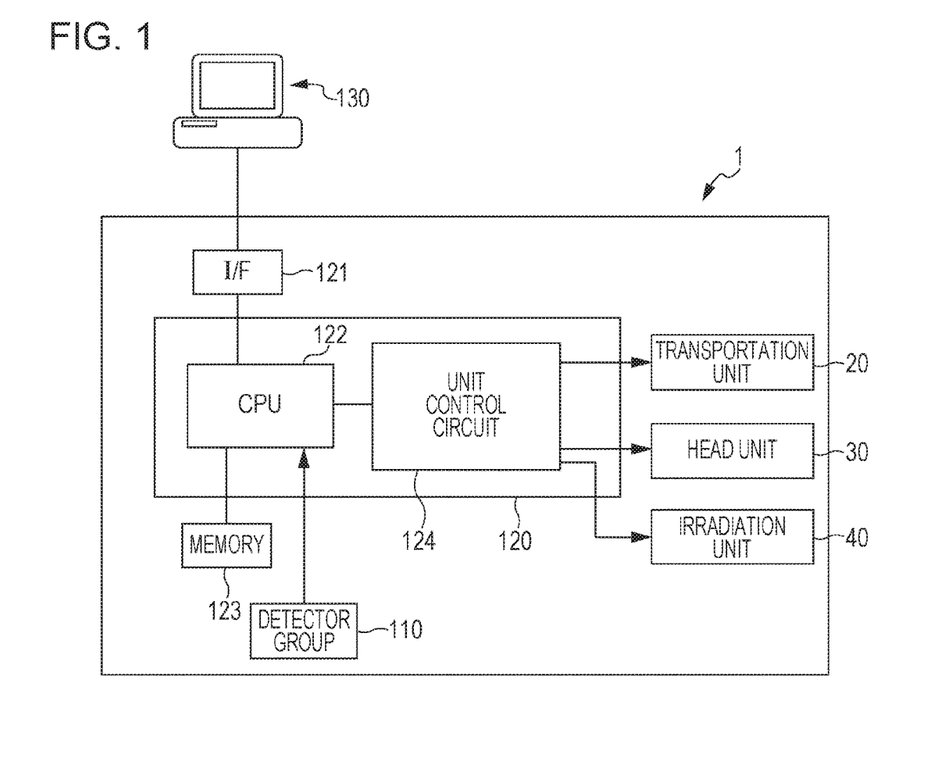
FIG. 1 is a block diagram illustrating an example of the configuration of a recording apparatus which may be used in this embodiment.

FIG. 1 is a block diagram illustrating an example of the configuration of a recording apparatus which may be used in this embodiment. In a computer 130, a printer driver is installed. The computer 130 outputs print data according to an image to the printer 1 in order to cause a printer 1 to record the image. The printer 1 has a transportation unit 20, a head unit 30, an irradiation unit 40, a detector group 110, a memory 123, an interface 121, and a controller 120. The controller 120 has a CPU 122 and a unit control circuit 124. The memory 123 also stores control information for controlling each unit. The printer 1 receiving the print data from the computer 130 which is an external apparatus controls each unit by the controller 120, and records an image on a target recording medium according to the print data. The status inside the printer 1 is monitored by the detector group 110, and the detector group 110 outputs detection results to the controller 120. The controller 120 controls each unit based on the detection results output from the detector group 110, and stores the print data input through the interface 121 in the memory 123.

Examples of types of the printer to be used in this embodiment include a line printer and a serial printer.

The line printer which is a line-system recording apparatus has a line head, which has length equal to or larger than the length equivalent to the width of a target recording medium, as a head. The radiation curable ink jet composition is discharged from the line head to a target recording medium while the line head and the target recording medium move the positions relatively to the scanning direction crossing the width direction. More specifically, the radiation curable ink jet composition is discharged from the line head towards the target recording medium scanned relatively to the line head. Then, with the line printer, recording is performed by one pass (single pass) while the head is fixed without (almost) moving.

On the other hand, in the serial printer which is a serial-system recording apparatus, a head performs main scanning (pass) of discharging the radiation curable ink jet composition while moving in the main scanning direction crossing the subscanning direction of a target recording medium, and recording is usually performed by 2 or more passes (multipass).

Figure 2:
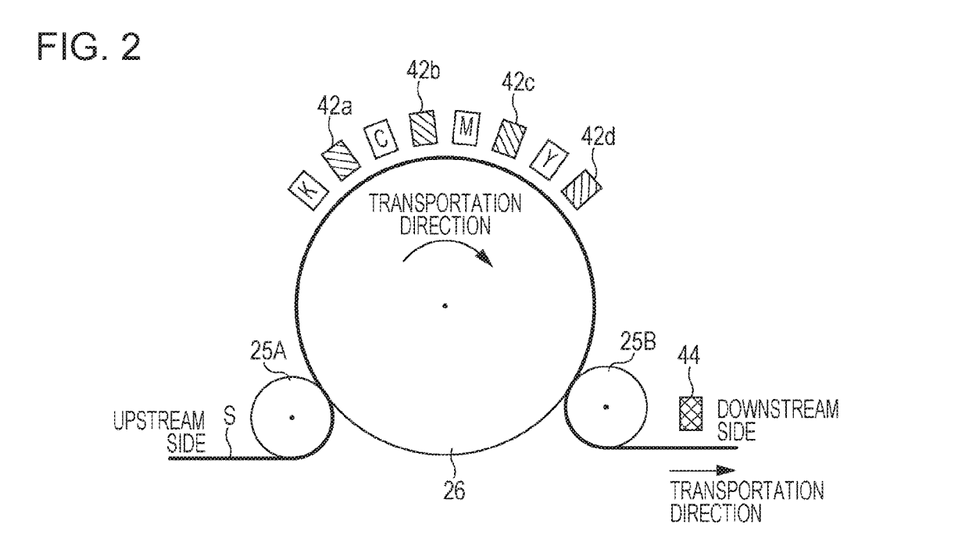
FIG. 2 is a schematic cross sectional view illustrating an example of the periphery of a head unit, a transportation unit, and an irradiation unit in a line printer which is an example of the recording apparatus which may be used in this embodiment.

Hereinafter, the line printer which is an example of the recording apparatus which may be used in this embodiment is described in detail with reference to FIG. 2. In FIG. 2 for use in the following description, the scale of each member is varied as appropriate in order for each member to have a recognizable size.

FIG. 2 is a schematic cross sectional view illustrating an example of the periphery of a head unit, a transportation unit, and an irradiation unit in the above-described line printer which is an example of the printer which may be used in this embodiment.

Transportation rollers containing an upstream side roller 25A and a downstream side roller 25B rotate by a transportation motor (not illustrated), and a transportation drum 26 follows the rotation. A target recording medium S is transported in connection with the rotation of the transportation roller along the peripheral surfaces of the upstream side roller 25A and the downstream side roller 25B which are the transportation rollers and the transportation drum 26 which is a support. Around the transportation drum 26, line heads containing a head K, a head C, a head M, and a head Y are disposed facing the transportation drum 26.

The transportation drum 26 has a surface transporting the target recording medium S, supports the target recording medium S with the surface, and moves relatively to the head. The movement at a predetermined cycle by the support may be performed at least while ink jet recording is performed and further may be continuously or intermittently performed while ink jet recording is performed.

The shape of the support is not limited to the support of a drum shape as illustrated in FIG. 2 and supports of a roller shape and a belt shape and a plate-shaped support (platen or the like) supporting the target recording medium S are also mentioned, for example, but the shape of the support is not particularly limited thereto. The movement of the support made relatively to the head may also be movement in which the support moves (rotates) in one direction to return to the same position or may also be movement in which the support returns to the same position combining movement in a certain direction and movement in another direction. In the case of the latter movement, an aspect is mentioned in which the movement in a certain direction is set to movement in connection with recording on one cut sheet type target recording medium and the movement in another direction is set to movement for performing recording on the following target recording medium after finishing recording on the one target recording medium.

In the case of a serial printer, the movement in a certain direction is equivalent to subscanning. The movement of the support made relatively to the head may be relative movement of the support to the head and also includes movement in which the head moves relative to the support.

Thus, recording is performed by a discharge operation of discharging the radiation curable ink jet composition towards the target recording medium S facing the line heads to cause the radiation curable ink jet composition to adhere thereto. On the downstream side in the transportation direction of each line head, temporary curing irradiation portions 42a, 42b, 42c, and 42d are disposed to irradiate the target recording medium S with ultraviolet rays. On the further downstream side in the transportation direction, a main curing irradiation portion is disposed. Such a recording apparatus can be configured as illustrated in FIG. 11 of JP-A-2010-269471, for example.

EXAMPLES

Hereinafter, the invention is more specifically described with reference to Examples and Comparative Examples. The invention is not particularly limited at all by the following Examples.

Materials of Radiation Curable Ink Jet Composition

Main materials of radiation curable ink jet compositions used in the following Examples and Comparative Examples are as follows.

Coloring Material
  Carbon Black
Acrylate Oligomer (A)
  CN996 (manufactured by Sartomer Company, Inc., Polyether-based aliphatic urethane acrylate oligomer, Number of functional groups: 2)
  CN989 (manufactured by Sartomer Company, Inc., Polyether-based aliphatic urethane acrylate oligomer, Number of functional groups: 3)
  EBECRYL9260 (manufactured by DAICEL-CYTEC Co., Ltd., Aliphatic urethane acrylate oligomer, Number of functional groups: 3)
  CN978 (manufactured by Sartomer Company, Inc., Polyester-based aromatic urethane acrylate oligomer, Number of functional groups: 2)
Other Acrylate Oligomers
  EBECRYL 8210 (manufactured by DAICEL-CYTEC Co., Ltd., Aliphatic urethane acrylate oligomer, Number of functional groups: 4)
  CN968 (manufactured by Sartomer Company, Inc., Polyester-based aliphatic urethane acrylate oligomer, Number of functional groups: 6)
  CN9013 (manufactured by Sartomer Company, Inc., Urethane acrylate oligomer, Number of functional groups: 9)
Monofunctional Monomer (B)
  V#150 (manufactured by Osaka Organic Chemical Industry Co., Ltd., Tetrahydrofurfuryl acrylates, Homopolymer glass transition temperature: −12° C.)
  V#160 (manufactured by Osaka Organic Chemical Industry Co., Ltd., Benzyl acrylates, Homopolymer glass transition temperature: 6° C.)
  V#155 (manufactured by Osaka Organic Chemical Industry Co., Ltd., Cyclohexyl acrylate, Homopolymer glass transition temperature: 15° C.)
  DA-141 (manufactured by Nagase Chemtex Corporation, 2-hydroxy-3-phenoxy propyl acrylate, Homopolymer glass transition temperature: 17° C.)
  CTFA (manufactured by Sartomer Company, Inc., Cyclic trimethylolpropane formal acrylate, Homopolymer glass transition temperature: 27° C.)
  CD420 (manufactured by Sartomer Company, Inc., 3,3,5-trimethyl cyclohexyl acrylate, Homopolymer glass transition temperature: 29° C.)
Monomer (C)
  VEEA (manufactured by NIPPON SHOKUBAI Co., Ltd., 2-(2-vinyloxyethoxy)ethyl) acrylate
Other Monomers
  PEA (manufactured by Daiichi Kogyo Seiyaku Co., Ltd., Phenoxyethyl acrylates, Homopolymer glass transition temperature: −22° C.)
  ACMO (manufactured by KOHJIN Film & Chemicals Co., Ltd., Acryloyl morpholine, Homopolymer glass transition temperature: 145° C.)

n-Vc (manufactured by product manufactured by Tokyo Kasei Kogyo Co., Ltd., N-vinyl caprolactam, Homopolymer glass transition temperature: 90° C.)

SR489 (manufactured by Sartomer Company, Inc., Tridecyl acrylate, Homopolymer glass transition temperature: −40° C.)

4-HBA (manufactured by Osaka Organic Chemical Industry Co., Ltd., 4-hydroxybutyl acrylate, Homopolymer glass-transition-temperature: −32° C.)

IBXA (manufactured by Osaka Organic Chemical Industry Co., Ltd., Isobornyl acrylate, Homopolymer glass transition temperature: 97° C.)

Polymerization Initiator

IRGACURE 819 (Trade Name, manufactured by BASF A.G.)

DAROCUR TPO (Trade Name, manufactured by BASF A.G.)

Speedcure DETX (Trade Name, manufactured by Lambson)

Polymerization Inhibitor

MEHQ (manufactured by Tokyo Kasei Kogyo Co., Ltd., p-methoxy phenol)

Surfactant

BYK-UV3500 (manufactured by BYK, Polyether-modified polydimethyl siloxane)

Dispersant

Solsperse 36000 (Trade Name, manufactured by Avecia Inc.)

Method for Measuring Glass Transition Temperature

In the measurement of the glass transition temperature, differential scanning calorimetry (DSC) based on JIS K7121 was performed and a "DSC6220" model manufactured by Seiko Instruments Inc. was used.

Preparation of Radiation Curable Ink Jet Composition

Materials were mixed according to the compositions shown in the following table 1, and then sufficiently stirred to give radiation curable ink jet compositions. In the following table 1, the unit of the numerical value is % by mass and the total is 100.0% by mass.

TABLE 1

| | | TG (° C.) | Number of functional groups | Examples 1 | 2 | 3 | 4 | 5 | 6 | 7 | 8 | 9 | 10 |
|---|---|---|---|---|---|---|---|---|---|---|---|---|---|
| Acrylate oligomer (A) | CN996 | — | 2 | 8.4 | 8.4 | 8.4 | 8.4 | 8.4 | 8.4 | 5 | 5 | 8.4 | 5 |
| Monofunctional monomer (B) | V#160 | 6 | 1 | 42 | | | | | | | | | |
| | V#150 | −12 | 1 | | | 42 | | | | 40 | 42 | 50 | 70 |
| | V#155 | 15 | 1 | | 56 | | 42 | | | | | | |
| | DA-141 | 17 | 1 | | | | | | | | | | |
| | CTFA | 27 | 1 | | | | | 42 | | | | | |
| | CD420 | 29 | 1 | | | | | | 42 | | | | |
| Other monomers | PEA | −22 | 1 | 14 | | 14 | 14 | 14 | 14 | 10 | 31.4 | 10 | 4.4 |
| | ACMO | 145 | 1 | | | | | | | | | | |
| | n-VC | 90 | 1 | | | | | | | | | | |
| | SR489 | −40 | 1 | | | | | | | | | | |
| | 4-HBA | −32 | 1 | | | | | | | | | | |
| | IBXA | 97 | 1 | | | | | | | | | | |
| Monomer (C) | VEEA | — | 2 | 20 | 20 | 20 | 20 | 20 | 20 | 33.4 | 10 | 16 | 5 |
| Polymerization inhibitor | MEHQ | | | 0.1 | 0.1 | 0.1 | 0.1 | 0.1 | 0.1 | 0.1 | 0.1 | 0.1 | 0.1 |
| Polymerization initiator | IRGACURE 819 | | | 5 | 5 | 5 | 5 | 5 | 5 | 3 | 3 | 5 | 5 |
| | DAROCUR TPO | | | 5 | 5 | 5 | 5 | 5 | 5 | 3 | 3 | 5 | 5 |
| | SpeeDCure DETX | | | 2 | 2 | 2 | 2 | 2 | 2 | 2 | 2 | 2 | 2 |
| Surfactant | BYK-UV3500 | | | 0.5 | 0.5 | 0.5 | 0.5 | 0.5 | 0.5 | 0.5 | 0.5 | 0.5 | 0.5 |
| Coloring material | Carbon black | | | 2 | 2 | 2 | 2 | 2 | 2 | 2 | 2 | 2 | 2 |
| Dispersant | solsperse 36000 | | | 1 | 1 | 1 | 1 | 1 | 1 | 1 | 1 | 1 | 1 |
| Total | | | | 100.0 | 100.0 | 100.0 | 100.0 | 100.0 | 100.0 | 100.0 | 100.0 | 100.0 | 100.0 |
| B/A | | | | 5.0 | 6.7 | 5.0 | 5.0 | 5.0 | 5.0 | 8.0 | 8.4 | 6.0 | 14.0 |
| A/C | | | | 0.4 | 0.4 | 0.4 | 0.4 | 0.4 | 0.4 | 0.1 | 0.5 | 0.5 | 1.0 |
| B/(Other monomers) | | | | 3.0 | — | 3.0 | 3.0 | 3.0 | 3.0 | 4.0 | 1.3 | 5.0 | 15.9 |
| Coating film abrasion resistance | | | | B | A | A | A | B | B | AA | A | A | A |
| Coating film drawability | | | | A | B | A | A | A | B | B | A | A | B |
| Curability | | | | A | B | A | A | A | A | A | B | A | B |
| Viscosity | | | | A | A | A | A | A | A | A | A | A | B |
| Odor | | | | 2 | 4 | 2 | 4 | 3 | 3 | 2 | 2 | 3 | 3 |

| | | TG (° C.) | Number of functional groups | Examples 11 | 12 | 13 | 14 | Comparative Examples 1 | 2 | 3 | 4 | 5 | 6 |
|---|---|---|---|---|---|---|---|---|---|---|---|---|---|
| Acrylate oligomer (A) | CN996 | — | 2 | 8.4 | 8.4 | 8.4 | 8.4 | 8.4 | 8.4 | 8.4 | 8.4 | 8.4 | 8.4 |
| Monofunctional monomer (B) | V#160 | 6 | 1 | | | | | 56 | | | | 52 | 38 |
| | V#150 | −12 | 1 | 40 | 40 | | | | | | | | |
| | V#155 | 15 | 1 | | | | | | | | | | |
| | DA-141 | 17 | 1 | | | 42 | | | | | | | |
| | CTFA | 27 | 1 | | | | | | | | | | |
| | CD420 | 29 | 1 | | | | | | | | | | |

TABLE 1-continued

| | | TG | Number of functional groups | | | | | | | | | |
|---|---|---|---|---|---|---|---|---|---|---|---|---|
| Other monomers | PEA | −22 | 1 | 10 | 10 | 14 | | 14 | 14 | 56 | 14 | 24 | 14 |
| | ACMO | 145 | 1 | | 10 | | | | | | | | |
| | n-VC | 90 | 1 | 10 | | | | | | | | | |
| | SR489 | −40 | 1 | | | | 42 | | | | | | |
| | 4-HBA | −32 | 1 | | | | | 42 | | | | | |
| | IBXA | 97 | 1 | | | | | | | | | 42 | |
| Monomer (C) | VEEA | — | 2 | 16 | 16 | 20 | 20 | 20 | 20 | 20 | 20 | | 24 |
| Polymerization inhibitor | MEHQ | | | 0.1 | 0.1 | 0.1 | 0.1 | 0.1 | 0.1 | 0.1 | 0.1 | 0.1 | 0.1 |
| Polymerization initiator | IRGACURE 819 | | | 5 | 5 | 5 | 5 | 5 | 5 | 5 | 5 | 5 | 5 |
| | DAROCUR TPO | | | 5 | 5 | 5 | 5 | 5 | 5 | 5 | 5 | 5 | 5 |
| | SpeeDCure DETX | | | 2 | 2 | 2 | 2 | 2 | 2 | 2 | 2 | 2 | 2 |
| Surfactant | BYK-UV3500 | | | 0.5 | 0.5 | 0.5 | 0.5 | 0.5 | 0.5 | 0.5 | 0.5 | 0.5 | 0.5 |
| Coloring material | Carbon black | | | 2 | 2 | 2 | 2 | 2 | 2 | 2 | 2 | 2 | 2 |
| Dispersant | solsperse 36000 | | | 1 | 1 | 1 | 1 | 1 | 1 | 1 | 1 | 1 | 1 |
| | Total | | | 100.0 | 100.0 | 100.0 | 100.0 | 100.0 | 100.0 | 100.0 | 100.0 | 100.0 | 100.0 |
| | B/A | | | 4.8 | 4.8 | 5.0 | 6.7 | 0.0 | 0.0 | 0.0 | 0.0 | 6.2 | 4.5 |
| | A/C | | | 0.5 | 0.5 | 0.4 | 0.4 | 0.4 | 0.4 | 0.4 | 0.4 | — | 0.4 |
| | B/(Other monomers) | | | 2.0 | 2.0 | 3.0 | — | 0.0 | 0.0 | 0.0 | 0.0 | 2.2 | 2.7 |
| | Coating film abrasion resistance | | | AA | AA | A | A | D | D | D | D | C | D |
| | Coating film drawability | | | AA | A | B | B | C | B | C | C | A | C |
| | Curability | | | A | AA | B | B | A | A | A | A | C | A |
| | Viscosity | | | A | A | D | A | A | A | A | A | C | A |
| | Odor | | | 2 | 2 | 4 | 2 | 2 | 2 | 3 | 3 | 2 | 2 |

TG: Homopolymer glass transition temperature
A/C: Ratio of content of acrylate oligomer (A) to content of monomer (C)
B/A: Ratio of content of monofunctional monomer (B) to content of acrylate oligomer (A)
B/(other monomers): Ratio of content of monofunctional monomer (B) to content of other monomers

TABLE 2

| | | TG (°C.) | Number of functional groups | Examples | | | | | | Comparative Examples | | | | |
|---|---|---|---|---|---|---|---|---|---|---|---|---|---|---|
| | | | | 15 | 16 | 17 | 18 | 19 | 20 | 7 | 8 | 9 | 10 | 11 |
| Acrylate oligomer (A) | CN996 | — | 2 | | | | 12 | 5 | 5 | | | | | |
| | CN989 | — | 3 | 8.4 | | | | | | | | | | |
| | EBECRYL 9260 | — | 3 | | 8.4 | | | | | | | | | |
| | CN978 | — | 2 | | | 8.4 | | | | | | | | |
| Another acrylate oligomer | EBECRYL 8210 | — | 4 | | | | | 3.4 | 8.4 | | | | | |
| | CN968 | — | 6 | | | | | | | 8.4 | | | | |
| | CN9013 | — | 9 | | | | | | | | 8.4 | | | |
| Monofunctional monomer (B) | V#150 | −12 | 1 | 42 | 42 | 42 | 40 | 42 | 42 | 42 | 42 | 42 | 42 | 45 |
| Other monomers | PEA | −22 | 1 | 14 | 14 | 14 | 17.4 | 17.4 | 14 | 14 | 14 | 14 | 10 | 16.4 |
| Monomer (C) | VEEA | — | 2 | 20 | 20 | 20 | 15 | 20 | 20 | 20 | 20 | 20 | 35.4 | 23 |
| Polymerization inhibitor | MEHQ | | | 0.1 | 0.1 | 0.1 | 0.1 | 0.1 | 0.1 | 0.1 | 0.1 | 0.1 | 0.1 | 0.1 |
| Polymerization initiator | IRGACURE 819 | | | 5 | 5 | 5 | 5 | 5 | 5 | 5 | 5 | 5 | 5 | 5 |
| | DAROCUR TPO | | | 5 | 5 | 5 | 5 | 5 | 5 | 5 | 5 | 5 | 5 | 5 |
| | SpeeDCure DETX | | | 2 | 2 | 2 | 2 | 2 | 2 | 2 | 2 | 2 | 2 | 2 |
| Surfactant | BYK-UV3500 | | | 0.5 | 0.5 | 0.5 | 0.5 | 0.5 | 0.5 | 0.5 | 0.5 | 0.5 | 0.5 | 0.5 |
| Coloring material | Carbon black | | | 2 | 2 | 2 | 2 | 2 | 2 | 2 | 2 | 2 | | 2 |
| Dispersant | solsperse 36000 | | | 1 | 1 | 1 | 1 | 1 | 1 | 1 | 1 | 1 | | 1 |
| | Total | | | 100.0 | 100.0 | 100.0 | 100.0 | 100.0 | 100.0 | 100.0 | 100.0 | 100.0 | 100.0 | 100.0 |
| | B/A | | | 5.0 | 5.0 | 5.0 | 3.3 | 8.4 | 8.4 | — | — | — | — | — |
| | A/C | | | 0.4 | 0.4 | 0.4 | 0.8 | 0.3 | 0.3 | 0.0 | 0.0 | 0.0 | 0.0 | 0.0 |
| | B/(Other monomers) | | | 3.0 | 3.0 | 3.0 | 2.3 | 2.4 | 3.0 | 3.0 | 3.0 | 3.0 | 4.2 | 2.7 |
| | Coating film abrasion resistance | | | AA | AA | A | A | AA | AA | AA | AA | AA | AA | B |
| | Coating film drawability | | | B | B | B | A | B | B | C | D | D | D | D |
| | Curability | | | A | A | A | B | A | A | A | A | A | A | B |
| | Viscosity | | | A | A | A | B | A | A | A | A | A | A | A |
| | Odor | | | 2 | 2 | 2 | 2 | 2 | 2 | 2 | 2 | 2 | 2 | 3 |

TG: Homopolymer glass transition temperature
A/C: Ratio of content of acrylate oligomer (A) to content of monomer (C)
B/A: Ratio of content of monofunctional monomer (B) to content of acrylate oligomer (A)
B/(other monomers): Ratio of content of monofunctional monomer (B) to content of other monomers Coating Film Drawability A 10 μm thick thin film was formed with a bar coater (manufactured by Dai-ichi Rika Co., Ltd.) using the radiation curable ink jet composition obtained as described above, and then cured at 400 mJ/cm$^2$ energy using a metal halide lamp. The obtained coating film was elongated with a TENSILON universal tester (Trade Name, manufactured by ORIENTEC), and then the elongation when cracking occurred was measured. The evaluation criteria are as follows.

AA: The elongation is 180% or more.
   A: The elongation is 120% or more and less than 180%.
   B: The elongation is 80% or more and less than 120%.
   C: The elongation is 40% or more and less than 80%.
   D: The elongation is less than 40%.

Coating Film Abrasion Resistance

With respect to each ink composition, a 8 μm thick coating film was formed on a Lumirror 125E20 (manufactured by TORAY) as a PET film using a bar coater (manufactured by Dai-ichi Rika Co., Ltd.). Subsequently, light of a peak wavelength of 395 nm was emitted at an irradiation intensity of 1 w/cm$^2$ using a UV irradiation LED apparatus RX-Firefly (manufactured by Phoseon) to produce a coating film cured to the tack-free state.

With respect to the obtained recording surface, the abrasion resistance of the coating film was evaluated according to JIS K 5701 (ISO 11628) (prescribing an ink and a vehicle sample for use in lithography and a method for testing a printed substance) using a GAKUSHIN type rubbing fastness tester (manufactured by TESTER SANGYO CO., LTD.). As an evaluation method, a high-quality paper was placed on the surface of the coating film, and then rubbed while applying a 500 g load. Then, the state of the coating film after rubbing was visually evaluated. The indices of evaluation are as follows.

AA: No stain was observed on the high-quality paper and no cracking was observed on the recording surface.
   A: No stain was observed on the high-quality paper and 1 to 3 streak marks were observed on the recording surface.
   B: Stain was observed on the high-quality paper and 1 to 3 streak marks were observed on the recording surface.
   C: Stain was observed on the high-quality paper and 4 or more streak marks were observed on the recording surface.
   D: Stain was observed on the high-quality paper and the recording surface was peeled.

Curability

The radiation curable ink jet composition obtained as described above was applied using a bar coater on a PET film (PET50A PL Thin [Trade Name], manufactured by Lintec Corporation). Thereafter, ultraviolet rays were emitted using an LED having a wavelength of 395 nm to cure the coating film. The thickness of the obtained coating film was 8 μm (Film thickness after curing). The cured coating film (cured film) was rubbed 10 times with a 100 g load using a cotton swab, and then the curing energy (irradiation energy) when no cracking was generated was determined. The irradiation energy [mJ/cm$^2$] was determined from the product of the measured irradiation intensity [mW/cm$^2$] on the irradiated surface irradiated from a light source and the irradiation duration [s]. The measurement of the irradiation intensity was performed using an ultraviolet ray intensity meter UM-10 and a light receiving portion UM-400 (all manufactured by KONICA MINOLTA SENSING, INC.). The evaluation criteria are as follows.

AA: 180 mJ/cm$^2$ or less
   A: More than 180 mJ/cm$^2$ and 200 mJ/cm$^2$ or less
   B: More than 200 mJ/cm$^2$ and 300 mJ/cm$^2$ or less
   C: More than 300 mJ/cm$^2$ Viscosity The viscosity at a temperature of 20° C. and a Shear rate of 200 s$^{-1}$ was measured using a rheometer (MCR-300, Trade Name, manufactured by Physica). The evaluation criteria are as follows.
   A: Less than 20 mPa·s
   B: 20 mPa·s or more and less than 30 mPa·s
   C: 30 mPa·s or more and less than 40 mPa·s
   D: 40 mPa·s or more Odor The odor intensity of each sample as compared with an odor intensity standard odor liquid (corresponding to six stages of 0 to 5) (Product of Japan Association on Odor Environment, n-butanol) was digitized by a six-stage odor intensity display method. The evaluation criteria are as follows.
   0: Non odor
   1: An odor is sensed with difficulty
   2: A weak odor is sensed and the odor source can be seen.
   3: An odor is sensed with ease.
   4: Strong odor
   5: Intense odor All the ink compositions according to an aspect of the invention of this application can be satisfactorily discharged and form an image using a SurePress L-4033A (manufactured by Seiko Epson Corp.).

Examples show that the configuration according to an aspect of the invention of this application enables an improvement of both the characteristics of the coating film abrasion resistance and the coating film drawability.

Moreover, the contrasts between Example 1 and Example 14 and between Example 4 and Example 2 show that the coating film drawability and the curability can be further improved due to further containing the monofunctional (meth)acrylate having an aromatic ring skeleton as the other monomers. This originates from the fact that the solubility of an initiator and an acrylate oligomer is improved due to the monofunctional (meth)acrylate having an aromatic ring skeleton.

Moreover, the contrast between Example 12 and Example 3 shows that the coating film abrasion resistance and the curability can be further improved due to further containing ACMO as the other monomers and the contrast between Example 11 and Example 3 shows that the coating film abrasion resistance and the coating film drawability can be improved due to further containing n-VC as the other monomers. It is imagined that the improvement of the abrasion resistance is achieved due to an increase in the strength of the coating film due to the bulky ring structure originating from the fact that the ACMO and the n-VC are the monofunctional monomers having a ring structure. Moreover, it is imagined that, due to the fact that the ACMO and the n-VC are monofunctional, the crosslink density does not increase and the coating film drawability is improved and, by using the monomer (C) in combination, the hardness, the abrasion resistance, and the drawability of the coating film are improved.

Moreover, the contrast between Example 15 and Example 3 shows that the coating film drawability is more excellent by the use of an acrylate oligomer having two acryloyl groups as the acrylate oligomer (A) and the coating film abrasion resistance is more excellent by the use of an acrylate oligomer having three acryloyl groups.

Moreover, the contrast between Example 17 and Example 3 shows that the coating film drawability is more excellent when a polyether-based aliphatic urethane acrylate oligomer is used as the acrylate oligomer (A).

Moreover, it is found from Example 20 that the effects of the invention of this application can be obtained even when an acrylate oligomer other than the acrylate oligomer (A) is contained.

On the other hand, when the monofunctional monomer (B) is not contained or when the content is less than 40% by mass even when contained as in Comparative Examples 1 to 4 and 6, sufficient coating film abrasion resistance or coating film drawability and particularly coating film abrasion resistance cannot be obtained. This is because when the glass transition temperature of the homopolymer of the monofunctional monomer (B) is −20° C. or more and 30° C. or less and the content is 40% by mass or more based on the entire composition, a film can be prevented from becoming brittle particularly due to the fact that the Tg is equal to or lower than the upper limit and the hardness of a film can be improved, so that good coating film abrasion resistance can be obtained particularly due to the fact that the Tg is equal to or higher than the lower limit.

Moreover, also when 40% by mass or more of the monofunctional monomer (B) is contained, sufficient coating film abrasion resistance cannot be obtained and the curability or the viscosity is also poor when the monomer (C) is not contained as in Comparative Example 5. This is because, by containing the monomer (C), the curability is improved and the hardness of a film is increased, so that good coating film abrasion resistance can be obtained.

Moreover, it is found that, when the acrylate oligomer (A) is not contained as in Comparative Examples 7 to 11, the coating film drawability is poor.

The entire disclosure of Japanese Patent Application No. 2017-036965, filed Feb. 28, 2017 is expressly incorporated by reference herein.

What is claimed is:

1. A radiation curable ink jet composition comprising:
    an acrylate oligomer (A);
    a monofunctional monomer (B) selected from the group consisting of a methoxy methacrylate homopolymer, a 2-hydroxyethyl acrylate homopolymer, a 2-ethylhexyl methacrylate homopolymer, a 2-hydroxybutyl acrylate homopolymer, a hexyl methacrylate homopolymer, a pentyl methacrylate homopolymer, an iso-propyl acrylate homopolymer, a propyl acrylate homopolymer, a benzyl acrylate homopolymer, a methyl acrylate homopolymer, a lauryl acrylate homopolymer, a hexadecyl methacrylate homopolymer, an ethoxyethyl methacrylate homopolymer, a 2-hydroxy-3-phenoxypropylacrylate homopolymer, an N,N-dimethylaminoethyl acrylate homopolymer, an N,N-dimethyl aminoethyl methacrylate homopolymer, an N,N-diethyl aminoethyl methacrylate homopolymer, a butylmethacrylate homopolymer, a pentyl acrylate homopolymer, a tetradecyl acrylate homopolymer, and a 2-hydroxybutylmethacrylate homopolymer; and
    a monomer (C) represented by a following formula (1), (1), wherein in Formula (1), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms, and wherein
    the acrylate oligomer (A) has 1 to 3 acryloyl groups,
    a glass transition temperature of a homopolymer of the monofunctional monomer (B) is −20° C. or more and 30° C. or less, and
    a content of the monofunctional monomer (B) is 40% by mass or more based on the entire radiation curable ink jet composition.
2. The radiation curable ink jet composition according to claim 1, wherein
    the acrylate oligomer (A) is a urethane acrylate oligomer.
3. The radiation curable ink jet composition according to claim 1, further comprising
    monofunctional (meth)acrylate containing an aromatic ring skeleton different from the monofunctional monomer (B).
4. The radiation curable ink jet composition according to claim 1, further comprising
    an acylphosphine oxide compound as an initiator.
5. The radiation curable ink jet composition according to claim 4, wherein
    a content of the initiator is 3 to 15% by mass based on the entire radiation curable ink jet composition.
6. The radiation curable ink jet composition according to claim 3, wherein
    a content of the monofunctional (meth)acrylate containing an aromatic ring skeleton is 3 to 35% by mass based on the entire radiation curable ink jet composition.
7. The radiation curable ink jet composition according to claim 1, wherein
    the glass transition temperature of the homopolymer of the monofunctional monomer (B) is −20° C. or more and 15° C. or less.
8. A recording method comprising:
    adhering the radiation curable ink jet composition according to claim 1 to a target recording medium; and
    curing the radiation curable ink jet composition adhering to the target recording medium using a UV light source.
9. A recording method comprising:
    adhering the radiation curable ink jet composition according to claim 2 to a target recording medium; and
    curing the radiation curable ink jet composition adhering to the target recording medium using a UV light source.
10. A recording method comprising:
    adhering the radiation curable ink jet composition according to claim 3 to a target recording medium; and
    curing the radiation curable ink jet composition adhering to the target recording medium using a UV light source.
11. A recording method comprising:
    adhering the radiation curable ink jet composition according to claim 4 to a target recording medium; and
    curing the radiation curable ink jet composition adhering to the target recording medium using a UV light source.
12. A recording method comprising:
    adhering the radiation curable ink jet composition according to claim 5 to a target recording medium; and
    curing the radiation curable ink jet composition adhering to the target recording medium using a UV light source.
13. A recording method comprising:
    adhering the radiation curable ink jet composition according to claim 6 to a target recording medium; and
    curing the radiation curable ink jet composition adhering to the target recording medium using a UV light source.
14. A recording method comprising:
    adhering the radiation curable ink jet composition according to claim 7 to a target recording medium; and
    curing the radiation curable ink jet composition adhering to the target recording medium using a UV light source.
15. A recording apparatus comprising:
    a discharging portion discharging the radiation curable ink jet composition according to claim 1; and
    an irradiation portion emitting ultraviolet rays.

16. A recording apparatus comprising:
a discharging portion discharging the radiation curable ink jet composition according to claim 2; and
an irradiation portion emitting ultraviolet rays.

17. A recording apparatus comprising:
a discharging portion discharging the radiation curable ink jet composition according to claim 3; and
an irradiation portion emitting ultraviolet rays.

18. A recording apparatus comprising:
a discharging portion discharging the radiation curable ink jet composition according to claim 4; and
an irradiation portion emitting ultraviolet rays.

19. A recording apparatus comprising:
a discharging portion discharging the radiation curable ink jet composition according to claim 5; and
an irradiation portion emitting ultraviolet rays.

20. A recording apparatus comprising:
a discharging portion discharging the radiation curable ink jet composition according to claim 6; and
an irradiation portion emitting ultraviolet rays.

* * * * *